Sept. 8, 1942.　　　　C. F. SCHNUCK　　　　2,295,362
MIXER FOR PLASTIC MATERIAL
Filed July 27, 1940　　　　3 Sheets-Sheet 1

Inventor
Carl F. Schnuck
By Rosewell Bartholow
Attorneys

Sept. 8, 1942. C. F. SCHNUCK 2,295,362
MIXER FOR PLASTIC MATERIAL
Filed July 27, 1940 3 Sheets-Sheet 3

Inventor
Carl F. Schnuck
By Portonell Buchbolov
Attorneys

Patented Sept. 8, 1942

2,295,362

UNITED STATES PATENT OFFICE 2,295,362

MIXER FOR PLASTIC MATERIAL

Carl F. Schnuck, New Haven, Conn., assignor to Farrel-Birmingham Company, Inc., Ansonia, Conn., a corporation of Connecticut Application July 27, 1940, Serial No. 347,864

4 Claims. (Cl. 18—2)

This invention relates to a machine for mixing and kneading plastic material, and more particularly to a machine for mixing rubber and compounding it with various ingredients, although it will be understood that the structure herein shown will be found useful in mixing and compounding materials other than rubber.

In processing rubber for commercial use the crude rubber is masticated or kneaded into a plastic mass, and usually it is mixed with various ingredients added to the mass of rubber, such as reinforcing pigments, softeners, fillers, and vulcanizing agents. It is highly essential that the mixing operation be thorough and complete, so that a thorough dispersion of the various ingredients through the mass of rubber is effected and a homogeneous product is obtained. This is necessary to securing uniformity in the product obtained by the mixing operation.

The present invention relates to a device for performing the mixing and kneading operations in a chamber of substantially cylindrical shape. In the form shown this chamber has an internally projecting rib at the intermediate portion thereof extending generally circumferentially of the chamber over a considerable portion of the inner wall. There is provided within the chamber a single rotor having therein a set of blades at each end, the blades being helically arranged so as to work the material toward the center of the chamber from each end thereof, past the intermediate rib.

Provision is made for feeding the charge of rubber and other ingredients into the chamber, which in the illustrated embodiment of my invention comprises a charging stack disposed substantially vertically and communicating with the chamber in such a manner that the charge enters the chamber in a direction substantially tangential to the cylindrical wall of the latter. This feeding of the chamber in a tangential direction has been found to be an advantageous method of charging the same, and it has also been discovered that the charging of the chamber will take place most effectively when the material is forced into the chamber in the void at the rear of the rotor blades. That is, the rotor blades, in passing about the circumferential wall of the chamber, will carry a portion of the charge around with them in front of the blade tips, and leave a void at the rear face of the blade, in which void the charge will be readily received.

It has also been discovered that, while the feeding of the chamber in a tangential direction is preferable in some respects to the location of the charging stack immediately above the rotor, for example, it is also desirable to arrange the opening through which the stack communicates with the chamber at a considerable distance from the vertical plane of the rotor axis. That is, as shown in Fig. 1 of the drawings, the charging stack is arranged to communicate with the chamber as far to the left as possible, so that even the inner edge of the stack will lie at a considerable distance from a point on the chamber wall directly above the rotor axis. In the present example the adjacent edge of the stack is spaced from a point above the rotor axis a distance of at least 30° measured circumferentially of the chamber. It has been found that when this relationship of the parts is employed, the feed of the rubber is obtained in a large part during the downward travel of the rotor blades, which facilitates the charging action. If, for example, the charging stack were arranged nearer to the center of the chamber or nearer to a point directly over the rotor, the blades would work against the direction of the entering charge and would tend to oppose this charge. When, however, the blade has passed a point on the circumference of the chamber approximately 30° from the high point of the chamber wall, or the point directly above the rotor, the subsequent movement of the blade is principally in a downward direction, and for this reason facilitates the reception of the charge into the chamber.

It is also contemplated in the present invention to arrange for the discharge of the chamber by a closure member which also moves in a tangential direction relatively to the working wall of the chamber, which closure member may be provided to move horizontally, as shown in one illustrated embodiment of the invention, or in a vertical direction substantially in line with the charging stack, as shown in the other embodiment of the invention.

One object of the invention is the provision of a rubber mixing machine having an improved construction with respect to the charging of the chamber of the apparatus with the ingredients to be treated.

Still another object of the invention is the provision of a rubber mixer or similar machine having a charging stack arranged to contact with a chamber of substantially cylindrical shape, the charging stack communicating with the chamber at a point at which the charge will be forced into the chamber when the motion of the rotor blades is principally in a downward direction, the charge being forced into the chamber in a downward direction and substantially tangentially to the chamber wall.

Another object of the invention is the provision of a rubber mixing machine having a chamber of cylindrical shape with improved charging and discharging means.

To these and other ends the invention consists in the novel features and combinations of parts to be hereinafter described and claimed.

Figures 1, 2:
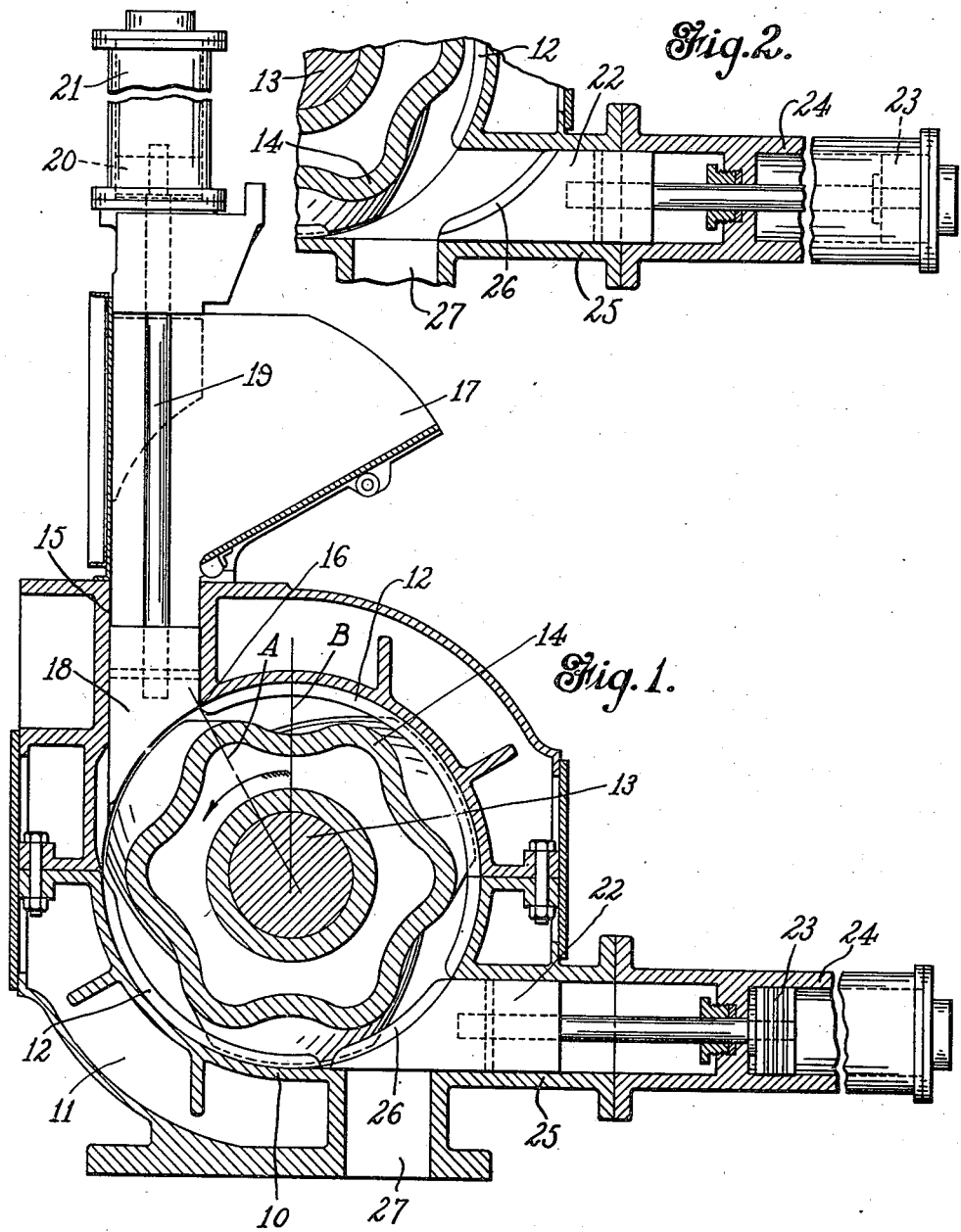
Fig. 1 is a transverse sectional view of the chamber of a rubber mixer and associated parts embodying my invention.
Fig. 2 is a sectional view of the discharging apparatus showing the parts in another position.

As illustrated in Fig. 1 of the drawings, I have shown a rubber mixing or masticating device comprising a chamber 10 of substantially cylindrical shape, the chamber being surrounded by a water or steam jacket 11 by which the temperature of the chamber contents may be controlled by the passage of a heating or cooling fluid through this jacket.

As shown, the chamber is provided with an extrusion rib 12 extending circumferentially about the wall thereof which rib is located intermediate the ends of the chamber and substantially at its central portion, and extends as nearly as practicable about the entire circumference of the chamber.

Rotatably mounted within the mixing chamber is a rotor 13 provided with a plurality of blades 14, which blades work the material around the chamber wall, and which are spirally arranged on the rotor to work the material from the ends inwardly past the central extrusion rib 12. It will be understood that the chamber and the bladed rotor heretofore described are of the general form of the corresponding parts shown in my co-pending application, Serial No. 301,004, filed October 24, 1939, so that further description of these parts will be unnecessary.

The chamber is provided with a charging stack 15, which projects upwardly from the chamber in a generally vertical direction, and which communicates with the chamber in a direction substantially tangential to the rotor. It may here be stated that the outer wall (or left-hand wall, as shown in Fig. 1) of the stack is substantially tangential to a horizontal diameter of the chamber, so that the stack will be offset as far as possible laterally from the rotor.

The charging stack 15 is relatively narrow in the cross-sectional dimension shown in Fig. 1, so that the inner wall of the stack will also not approach too closely to a point directly over the center of the rotor. In fact, it has been found to be advantageous to provide a stack of such a width with relation to the size of the chamber that there will be at least 30° of the circumferential surface of the chamber lying between a vertical plane through the rotor axis and the adjacent edge of the stack. In other words, the line A, drawn from the center of the rotor to the point 16, at which the inner wall of the stack intersects the chamber, will make an angle of at least 30° with the line B, drawn vertically through the center of the rotor. As will be apparent after the rotor has passed over an angle of 30° from the line B, its subsequent motion will be principally in a downward direction, and therefore will be largely in the same direction as that of the entering charge, which will facilitate the charging operation.

Communicating with the stack 15 is a hopper 17 through which the material may be loaded into the stack, and mounted to slide vertically in the stack is a plunger 18 carried by the rod 19, this rod being secured to a piston 20 mounted in a cylinder 21, so that the plunger 18 may be raised and lowered by fluid pressure, as is usual in similar devices. The inner end of the plunger 18 is preferably rounded to conform to the inner periphery of the chamber wall, so that when the plunger is in closed position, as shown in Fig. 1, the opening of the stack thereinto will be closed and the chamber will present a substantially continuous cylindrical inner surface.

The discharge of the chamber may be effected through an opening at the lower portion thereof, this opening being controlled by a plunger or closure member which also moves in a direction substantially tangential to the chamber. As shown in Figs. 1 and 2 of the drawings, the discharge control member comprises a plunger 22 operated by a piston 23 in a cylinder 24, the plunger being arranged to be reciprocated in a horizontal direction in a guide 25 extending from the chamber. The piston 22 may have provided thereon a rib 26 which extends between the adjacent ends of the ribs 12 on the chamber wall at each side thereof, this rib serving as a continuation of the ribs on the chamber wall.

The discharge of the chamber is effected through a passage 27 extending downwardly from the chamber at the lower portion thereof, and it will be apparent that the plunger 22 is adapted to move across the opening 27 so as to close the communication between this opening and the chamber and effectively close the latter, as shown in Fig. 1.

When the discharge of the chamber is desired, the plunger 22 is moved to the right by the piston 23, as shown in Fig. 2, this movement serving to effect communication between the discharge passage 27 and the chamber forwardly of the plunger, and the action of the rotor will cause the charge to be expelled through the passage 27.

Figure 3:
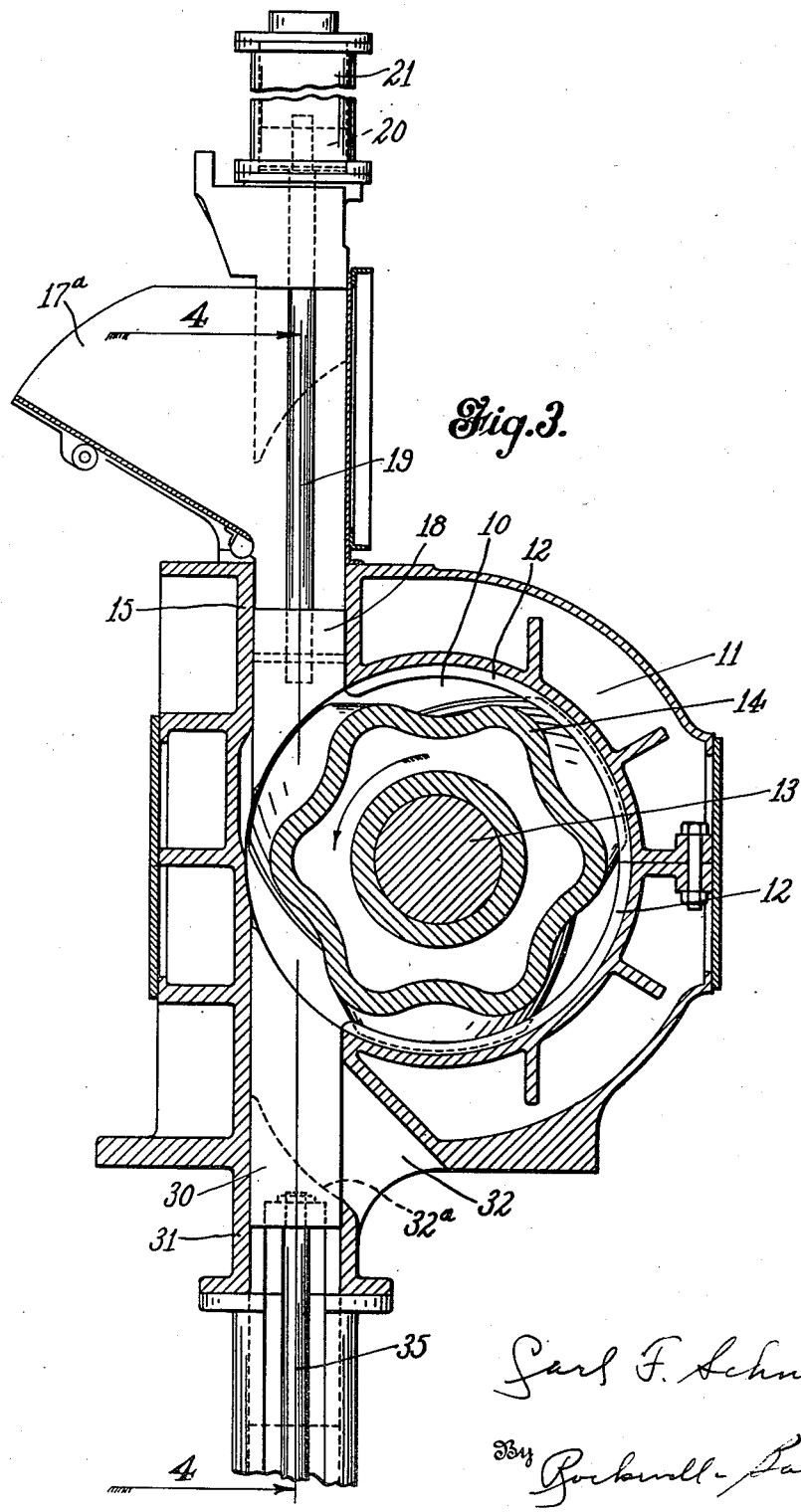
Fig. 3 is a view similar to Fig. 1 but showing a somewhat modified form of my invention.

A somewhat modified embodiment of my invention is shown in Fig. 3, wherein the mixing chamber 10, the rotor 13, and the charging stack 15 are substantially like those shown in Figs. 1 and 2. In this instance also the charging stack is located in the same position with respect to the bladed rotor, as shown in Fig. 1, so that the charging of the material takes place during the movement of the rotor blades in a downward direction. The hopper 17a communicates with the stack 15 at the side opposite that shown in Fig. 1, so that the material in this instance is charged from the opposite side of the machine. It will also be understood that the charging is controlled by the plunger 18, as previously described, and that the mixing chamber is likewise provided with the extrusion rib 12.

The modification shown in Figs. 3 and 4 differs principally from the modification first described in that the discharge-control plunger 30 is arranged to move in a guideway 31 disposed substantially vertically and mounted directly below the charging stack 18, so as to receive the material from the rotor blades while the motion of the latter is principally in a downward direction.

The discharge of the material is effected through a discharge passage 32, which passage is controlled by the plunger 30, this plunger being movable downwardly by fluid-operated means to the dotted line position indicated at 32a, in which the discharge passage is in free communication with the mixing chamber.

Figure 4:
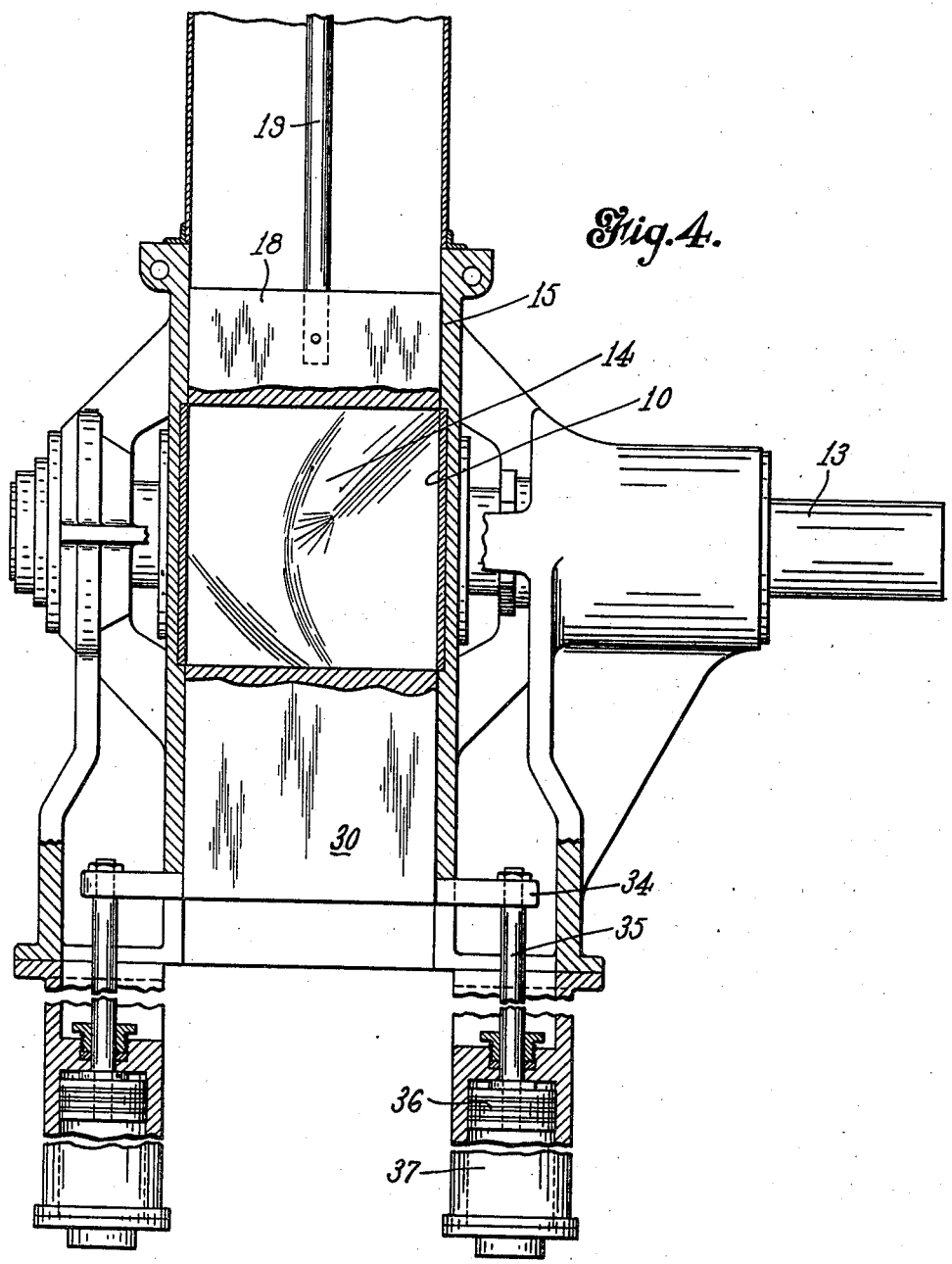
Fig. 4 is a sectional view on line 4—4 of Fig. 3.

As shown in Fig. 4, the plunger 30 may be provided with projecting lugs 34 having secured thereto rods 35 connected to pistons 36 arranged in cylinders 37, so that the plunger 30 may be held firmly in its upper position to resist the considerable pressure of the charge thereon during the mixing operation. When the plunger is withdrawn to open position, the action of the rotor blades will serve to positively force the material through the discharge opening 32, so as to effect the discharge of the chamber in an efficient manner. Due to the fact that in this instance the discharge passage communicates with the chamber at a point at which the action of the blades will be principally in a downward direction, the movement of the charge by the blades through the chamber will be substantially in line with the discharge passage and the efficient discharge of the chamber will thus be promoted.

It will also be apparent that in the embodiment of the invention shown in Figs. 1 and 2 the movement of the plunger will be in a tangential direction with respect to the chamber, and the opening movement of the plunger will be in the direction generally assumed by the charge at that point in the chamber under the action of the rotor blades, so that in each instance the pressure of the charge will be in the direction of the opening movement of the plunger. It will also be apparent that with the charging stack located as described, the movement of the charge will principally be in a direction away from that of the entering charge, and away from the downward or charging movement of the charging plunger.

While I have shown and described some preferred embodiments of my invention, it will be understood that it is not to be limited to all of the details shown, but is capable of modification and variation within the spirit of the invention and within the scope of the appended claims.

What I claim is:

1. A masticating apparatus comprising a chamber of cylindrical shape, a bladed rotor rotatably mounted in the chamber and adapted to knead the charge therein, a vertically disposed charging stack communicating with said chamber with one wall of said stack extending from the chamber substantially tangentially to the circumferential wall of the chamber, said chamber having a discharge opening with one wall of said opening disposed in a plane substantially tangent to the circumferential wall of the chamber, said opening extending in the general direction in which the charge is moved by the rotor adjacent the opening, and a movably mounted plunger to control said opening, said plunger being movable in a direction substantially transverse to the chamber axis.

2. A masticating apparatus comprising a chamber of cylindrical shape, a bladed rotor rotatably mounted in the chamber and adapted to knead the charge therein, a vertically disposed charging stack communicating with said chamber with one wall of said stack extending from the chamber substantially tangentially to the circumferential wall of the chamber, said chamber having a discharge opening with one wall of said opening disposed in a plane substantially tangent to the circumferential wall of the chamber, said opening extending in the general direction in which the charge is moved by the rotor adjacent the opening, and a movably mounted plunger to control said opening, said plunger being movable in a direction substantially transverse to the chamber axis, said discharge opening lying directly below the charging stack and on the same side of the chamber axis.

3. A masticating apparatus comprising a chamber of cylindrical shape, a bladed rotor rotatably mounted in the chamber and adapted to knead the charge therein, a vertically disposed charging stack communicating with said chamber with one wall of said stack extending from the chamber substantially tangentially to the circumferential wall of the chamber, said chamber having a discharge opening with one wall of said opening disposed in a plane substantially tangent to the circumferential wall of the chamber, said opening extending in the general direction in which the charge is moved by the rotor adjacent the opening, a movably mounted plunger to control said opening, said plunger being movable in a direction substantially transverse to the chamber axis, means providing a guideway for the discharge plunger extending from said opening, and said guideway having a discharge passage through a wall thereof.

4. A masticating apparatus comprising a chamber of cylindrical shape, a bladed rotor rotatably mounted in the chamber and adapted to knead the charge therein, said chamber having a charging opening and a vertically disposed charging stack rising from said opening with one wall of said stack extending from the chamber substantially tangentially to the circumferential wall of the chamber, the edge of said opening nearer the vertical plane of the rotor axis being spaced a distance of more than 25° from a point directly above the rotor axis on the circumferential wall of the chamber, said chamber having a discharge opening with one wall of said opening disposed in a plane substantially tangent to the circumferential wall of the chamber, said opening extending in the general direction in which the charge is moved by the rotor adjacent the opening, and a movably mounted plunger to control said opening, said plunger being movable in a direction substantially transverse to the chamber axis.

CARL F. SCHNUCK.